US012699574B2

(12) United States Patent
Gersht et al.

(10) Patent No.: US 12,699,574 B2
(45) Date of Patent: Aug. 4, 2026

(54) COPYING COMPUTING RESOURCES BETWEEN EXECUTION ENVIRONMENTS

(71) Applicant: RED HAT, INC., Raleigh, NC (US)

(72) Inventors: Ilan Gersht, Bat Yam (IL); Arie Bregman, Gan Yavne (IL); Avraham Talmor, Rishon Letzion (IL)

(73) Assignee: Red Hat, Inc., Raleigh, NC (US)

( * ) Notice: Subject to any disclaimer, the term of this patent is extended or adjusted under 35 U.S.C. 154(b) by 620 days.

(21) Appl. No.: 17/502,450

(22) Filed: Oct. 15, 2021

(65) Prior Publication Data

US 2023/0118880 A1     Apr. 20, 2023

(51) Int. Cl.

| | |
|---|---|
| *G06F 9/445* | (2018.01) |
| *G06F 8/61* | (2018.01) |
| *G06F 8/658* | (2018.01) |
| *G06F 9/455* | (2018.01) |
| *G06F 21/53* | (2013.01) |

(52) U.S. Cl.
CPC .......... *G06F 9/44505* (2013.01); *G06F 8/658* (2018.02); *G06F 9/45558* (2013.01); *G06F 21/53* (2013.01); *G06F 2009/45587* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 6,427,227 | B1 * | 7/2002 | Chamberlain | ............ G06F 8/60 717/124 |
| 9,092,248 | B1 * | 7/2015 | Makin | ................. G06F 9/45558 |
| 9,705,965 | B2 | 7/2017 | Zhang et al. | |
| 9,811,365 | B2 | 11/2017 | Borthakur | |
| 9,858,114 | B2 | 1/2018 | Fries | |
| 10,063,688 | B1 * | 8/2018 | Sinibaldi | ........... H04M 1/72463 |
| 10,789,089 | B2 | 9/2020 | Hari | |
| 11,023,286 | B2 | 6/2021 | Liu | |
| 2009/0144728 | A1 * | 6/2009 | Felts | ......................... G06F 8/60 717/175 |
| 2014/0208314 | A1 * | 7/2014 | Jeswani | .............. G06F 9/45533 718/1 |
| 2016/0254952 | A1 * | 9/2016 | Harvey | ................. G06F 3/0482 715/735 |
| 2017/0139743 | A1 * | 5/2017 | Fries | ......................... G06F 8/76 |
| 2018/0329700 | A1 | 11/2018 | Doshi et al. | |
| 2020/0304571 | A1 | 9/2020 | Ranjan | |
| 2023/0251878 | A1 * | 8/2023 | Mastracci | .............. G06F 3/048 715/704 |

* cited by examiner

*Primary Examiner* — Mustafa A Amin
(74) *Attorney, Agent, or Firm* — Womble Bond Dickinson (US) LLP

(57) ABSTRACT

Systems and methods for copying a computing resource from a source execution environment to a destination execution environment. An example method may comprise receiving, by a processing device, a copy request to copy a computing resource from a source execution environment to a destination execution environment; retrieving, from the source execution environment, configuration data associated with the computing resource; modifying, in view of a configuration of the destination execution environment, a value of a configuration parameter of the configuration data; and installing, on the destination execution environment, the computing resource using the configuration data.

20 Claims, 6 Drawing Sheets

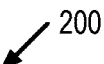
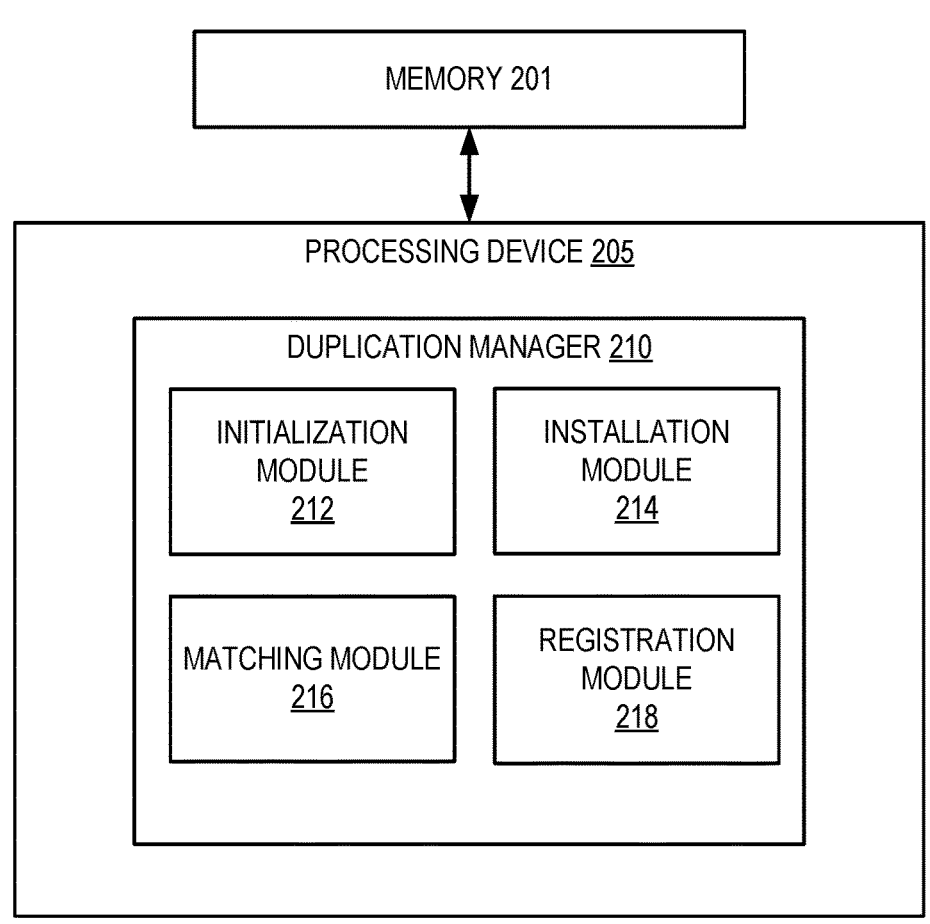
FIG. 2

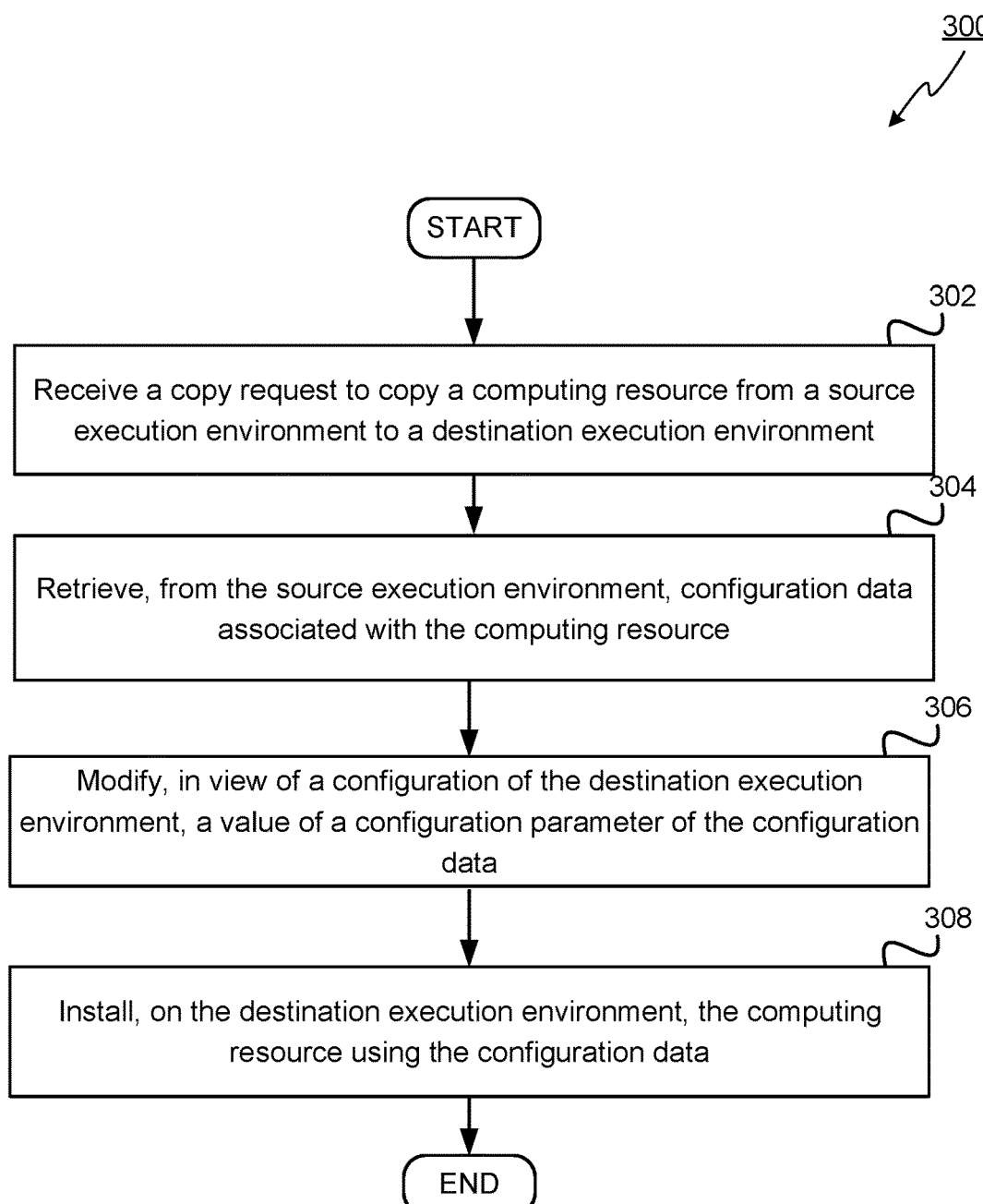

300

START

302

Receive a copy request to copy a computing resource from a source execution environment to a destination execution environment

304

Retrieve, from the source execution environment, configuration data associated with the computing resource

306

Modify, in view of a configuration of the destination execution environment, a value of a configuration parameter of the configuration data

308

Install, on the destination execution environment, the computing resource using the configuration data

END

FIG. 3

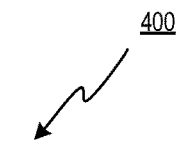
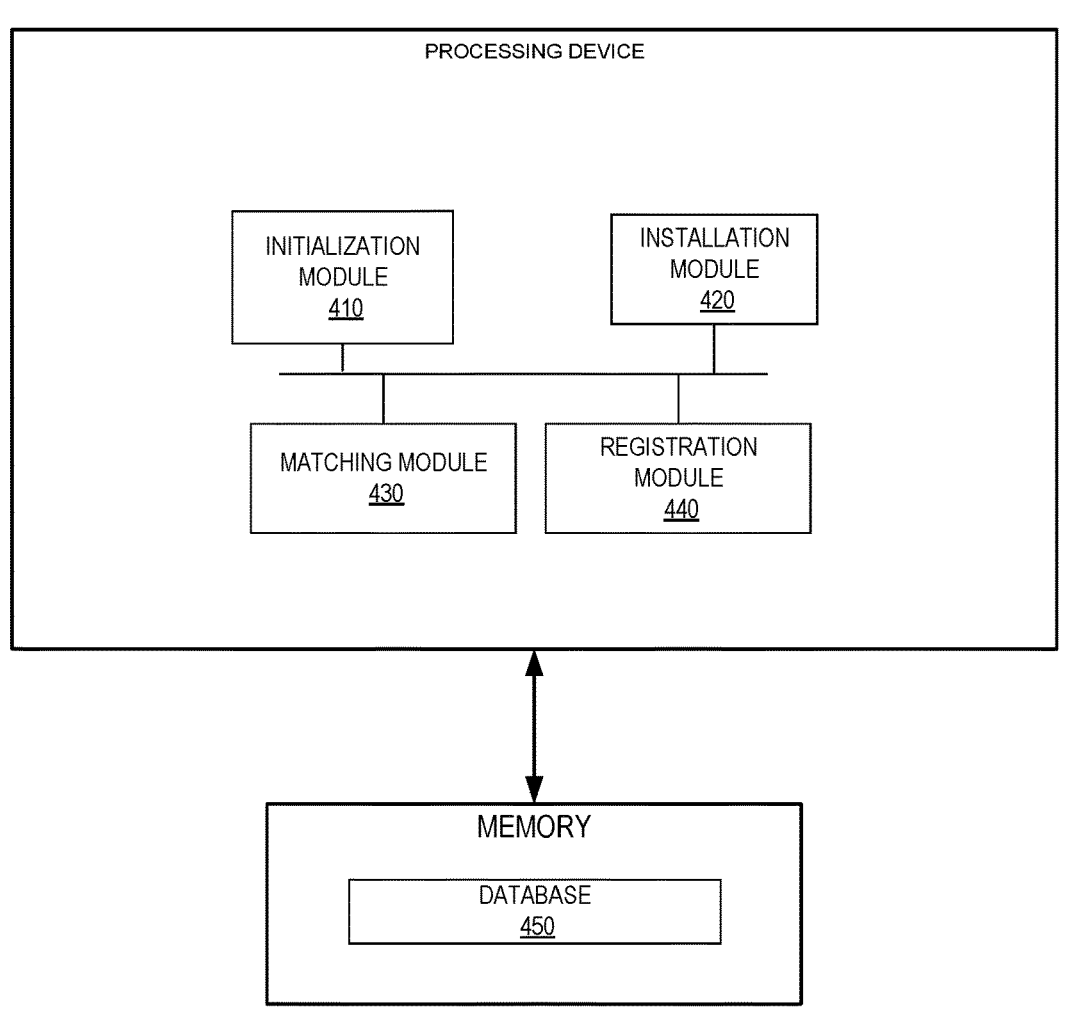
FIG. 4

COPYING COMPUTING RESOURCES BETWEEN EXECUTION ENVIRONMENTS

TECHNICAL FIELD

The implementations of the disclosure generally relate to computer systems and, more specifically, to copying computing resources between execution environments.

BACKGROUND

Platform-as-a-Service (PaaS) system offerings can include software and/or hardware facilities for facilitating the execution of applications (web applications, mobile applications, etc.) in a cloud computing environment (the "cloud"). Cloud computing is a computing paradigm in which a user engages a "cloud provider" to execute a program on computer hardware owned and/or controlled by the cloud provider. A cloud provider can make virtual machines (VMs) hosted on its computer hardware available to customers for this purpose. The cloud provider can provide an interface that a user can use to requisition virtual machines and associated resources such as security policies, processors, storage, and network services, etc., as well as an interface to install and execute the user's applications and files on the virtual machines.

PaaS offerings can facilitate deployment of web applications without the cost and complexity of buying and managing the underlying hardware and software and provisioning hosting capabilities, providing the facilities to support the complete life cycle of building and delivering web applications and services entirely available from the Internet.

BRIEF DESCRIPTION OF THE DRAWINGS

The present disclosure is illustrated by way of example, and not by way of limitation, and can be more fully understood with reference to the following detailed description when considered in connection with the figures in which:

FIG. 2 depicts a block diagram illustrating an example of a duplication manager, in accordance with one or more aspects of the present disclosure.

FIG. 3 depicts a flow diagram of a method for copying a computing resource from a source execution environment to a destination execution environment, in accordance with one or more aspects of the present disclosure.

FIG. 4 depicts a block diagram of an example computer system in accordance with one or more aspects of the present disclosure.

DETAILED DESCRIPTION

Figure 1:
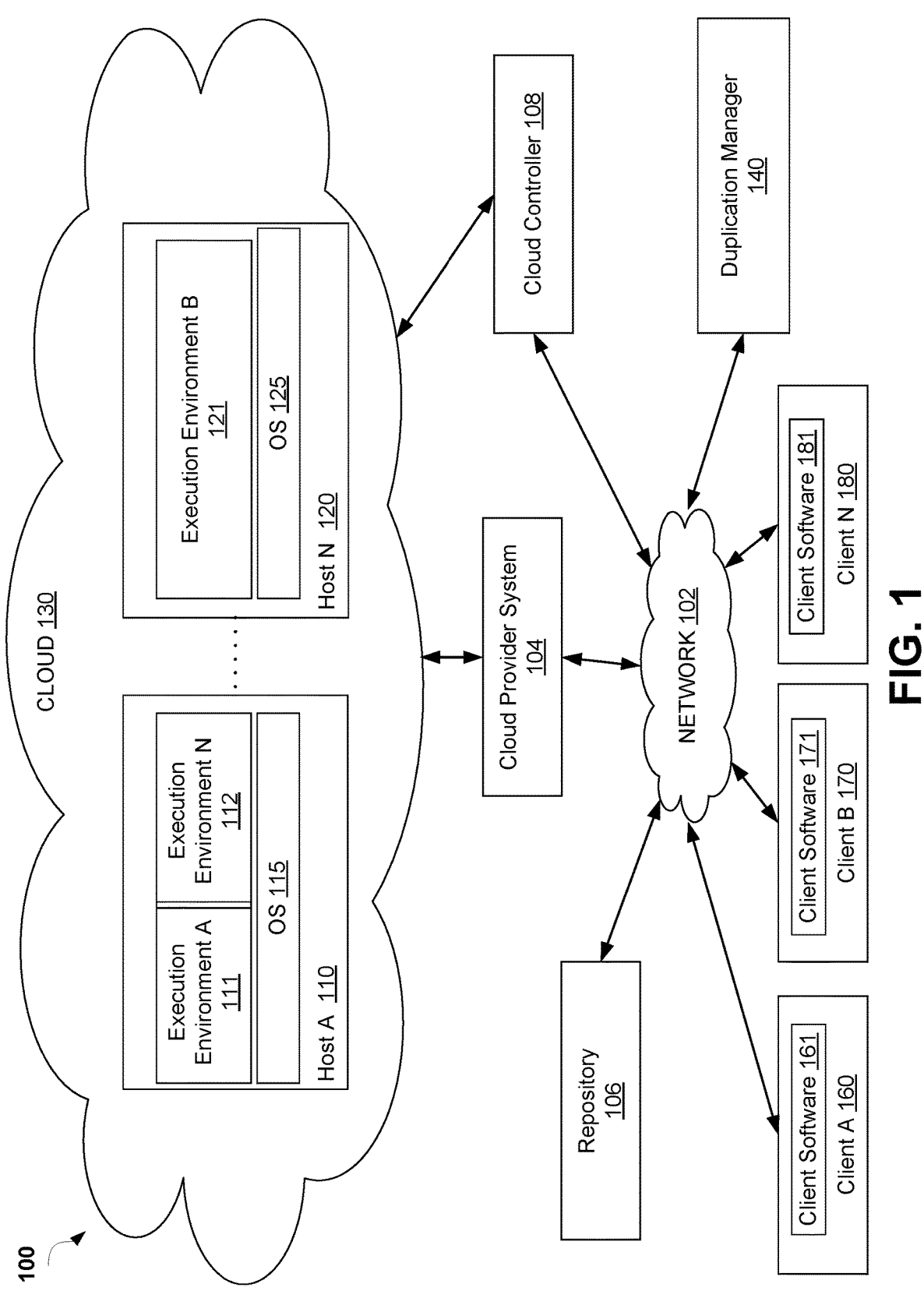
FIG. 1 depicts a high-level component diagram of an example computer system architecture, in accordance with one or more aspects of the present disclosure.

Described herein are methods and systems for copying computing resources between execution environments in a cloud computing environment. Cloud computing environments provide many advantages over locally owned computing systems. For example, cloud computing environments can optimize resources by sharing them across multiple users and multiple clients, thereby reducing costs otherwise dedicated to procuring and maintaining local hardware. Additionally, cloud computing environments provide improved scalability for clients. Instead of purchasing additional local computing resources, supporting more data storage and buying more software licenses to support growth in the business, users can rent more storage space, acquire more bandwidth and increase access to software programs which are controlled by a cloud computing provider.

A cloud provider can make execution environments, such as virtual machines (VMs), hosted on its computer hardware available to customers, and provide the client with an interface and tools for installing and executing computing resources on the VM. Computing resources may include applications, computer services, configuration files, or any other computing processes installed or executed on a VM. An application may be a software program deployable on a virtual machine, such as, for example, nested VMs, containers, databases, web applications, web services, caches, libraries, multimedia applications, etc. A computing service may be any type of function(s) provided by and/or to the virtual machine, such as, for example, web services, synchronization services, data services, operating system services, management services, drivers, etc. A configuration file may be any software used to configure the parameters and/or settings of a computer program.

Cloud computing environments, however, can present challenges with the copying of computing resources from one VM to another. In particular, current cloud providers lack tools capable of copying a computing resource from a source VM to a destination VM. As such, current system may resort to copying an operation resource using snapshots or by duplicating the entire VM. However, these methods are time consuming and require manually modifying certain setting, such as host names and internet protocol (IP) addresses.

Aspects of the present disclosure address the above noted and other deficiencies by implementing a system capable of copying a computing resource from one execution environment (e.g., VM) to another execution environment of a cloud environment. In particular, processing logic used by the present system may provide (e.g., display on a graphical user interface (GUI) of the client device) a list of computing resources that are installed and/or executing on a source execution environment. To generate the list, the processing logic may execute a discovery process, such as, for example, executing a query to retrieve, from a repository, a list of services currently running on the source execution environment. In another example, the processing logic may generate the list by executing a command to identify a set of directories where executable programs (e.g., applications) are located. Responsive to receiving a selection of a computing resource to copy, the processing logic may retrieve configuration data associated with the computing resource. The configuration data may include a software installation package, configuration files, location data of installation files (e.g., uniform resource locator (URL), server address, etc.), update data, or any other data associated with installing or running the computing resource. In some embodiments, to retrieve the configuration data, the processing logic may query a package management system for data associated with the computing resource. The package management system is a collection of software tools that automates the process of installing, upgrading, configuring, and removing computer programs from an execution environment. The package management system may maintain a database of package configuration data, software dependencies, meta-data (software's name, description of its purpose, version data, vendor data, checksum data, a list of dependencies necessary for the software to run properly), modifications that were performed on the computing resource, and so forth. This database may be updated each time a new computing resource is installed.

Using the configuration data, the processing logic may install or execute the computing resource on the destination execution environment. For example, the processing logic may instruct the operating system of the destination execution environment to install the computing resource using the installation software package, using a URL address to retrieve executable data associated with the installation of the computing resource, etc. The processing logic may then determine whether there are any configuration differences (e.g., differences in corresponding configuration files) between the computing resource executing on the source execution environment, and the computing resource installed on the destination execution environment. In one example, the processing logic may retrieve one or more configuration files associated with the computing resource executing on the source execution environment, retrieve one or more configuration files installed on the destination execution environment, and compare the parameters of the configuration files. The processing logic may obtain the configuration files by, for example, querying the package management system. Responsive to determining that a pair of correlating configuration parameters are different, the processing logic may generate and execute a patch file to modify said configuration parameter on the destination execution environment. In some embodiments, the process-ing logic may determine whether there are any configuration differences and generate the patch files prior to install or execute the computing resource on the destination execution environment, and then apply the patch files during the installation of the computing resource on the destination execution environment.

In some embodiments, the computing resource configu-ration may include host-specific parameters, such as a host name, an internet protocol (IP) address, a media access control (MAC) address, a user name, a network address, subnet mask, default gateway, etc. The processing logic may maintain a database which lists different host-specific parameters, and query the package management system to determine whether the computing resource configuration includes any of the host-specific parameters. Responsive to the query being indicating that the computing resource configuration includes one or more host-specific parameters, the processing logic may modify the host-specific param-eters of the computing resource installed on the destination execution environment to prevent conflict related errors from occurring. Accordingly, aspects of the present disclo-sure enable the duplication of a computing resource from one execution environment to another execution environ-ment using a cloud computing environment, without need-ing to rely on external and time consuming methods, or need to copy an entire VM, thus improving utilization of com-puting resources.

Various aspects of the above referenced methods and systems are described in details herein below by way of examples, rather than by way of limitation. The examples provided below discuss copying, from a source execution environment to a destination execution environment, an installed and or executing computing resource.

FIG. 1 is a block diagram of a network architecture 100 in which implementations of the disclosure may operate. In some implementations, the network architecture 100 may be used in a containerized computing services platform. As discussed above, a containerized computing services plat-form may include a Platform-as-a-Service (PaaS) system, such as OpenShift® or Kubernetes®. The PaaS system provides resources and services (e.g., micro-services) for the development and execution of applications owned or man-aged by multiple users. A PaaS system provides a platform and environment that allow users to build applications and services in a clustered compute environment (the "cloud"). Although implementations of the disclosure are described in accordance with a certain type of system, this should not be considered as limiting the scope or usefulness of the features of the disclosure. For example, the features and techniques described herein can be used with other types of multi-tenant systems and/or containerized computing services platforms.

As shown in FIG. 1, the network architecture 100 includes a cloud-computing environment 130 (also referred to herein as a cloud) that includes execution environments 111, 112, 121 to execute applications and/or processes associated with the applications. An "execution environment" providing computing functionality may provide the execution envi-ronment for an application of the PaaS system. In some implementations, the "execution environment" may refer to a virtual machine (VM) that is hosted on a physical machine, such as host 110 through host 120, implemented as part of the cloud 130. For example, execution environments 111 and 112 are hosted on physical machine of host 110 in cloud 130 provided by cloud provider 104. In some implementations, an environment other than a VM may be used to execute functionality of the PaaS applications. When execution environment 111, 112, 121 are implemented as VMs, they may be executed by operating systems (OSs) 115, 125 on each host machine 110, 120.

In some implementations, the host machines 110, 120 are often located in a data center. Users can interact with applications executing on the cloud-based execution envi-ronments 111, 112, 121 using client computer systems, such as clients 160, 170 and 180, via corresponding client soft-ware 161, 171 and 181. Client software 161, 171, 181 may include an application such as a web browser. In other implementations, the applications may be hosted directly on hosts A through N 110, 120 without the use of VMs (e.g., a "bare metal" implementation), and in such an implementa-tion, the hosts themselves are referred to as "execution environments".

Clients 160, 170, and 180 are connected to hosts 110, 120 in cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In various implementations, developers, owners, and/or system administrators of the applications may maintain applications executing in cloud 130 by providing software development services, system administration services, or other related types of configuration services for associated execution environments in cloud 130. This can be accom-plished by accessing cloud 130 using an application programmer interface (API) within the applicable cloud service provider system 104. In some implementations, a developer, owner, or system administrator may access the cloud service provider system 104 from a client device (e.g., clients 160, 170, and 180) that includes dedicated software to interact with various cloud components. Additionally, or alternatively, the cloud service provider system 104 may be accessed using a web-based or cloud-based application that executes on a separate computing device that communicates with a client device via network 102.

In one implementation, the cloud provider system 104 is coupled to a cloud controller 108 via the network 102. The cloud controller 108 may reside on one or more machines (e.g., server computers, desktop computers, etc.) and may manage the execution of computing resources in the cloud 130. In some implementations, cloud controller 108 receives commands from duplication manager 140. In view of these commands, the cloud controller 108 provides data, to the cloud provider system 104, such as a copy list, configuration data, and configuration parameters associated with different execution environments or computing resources executing on said execution environments. In some implementations, the data may be provided to the cloud provider 104 and stored in a data repository 106, in a data repository (not shown) located on each host 110, 120, or in a data repository (not shown) located on each execution environment 111, 112, 121. This data may be used for copying a computing resource from a source execution environment to a destination execution environment. For example, the data may be used to copy an application or a service from execution environment A 111 to execution environment B 121.

In some implementations, duplication manager 140 implements duplication management for the cloud-based PaaS system described above. While aspects of the present disclosure describe duplication manager 140 as implemented in a PaaS environment, it should be noted that in other implementations, duplication manager 140 can also be implemented in an Infrastructure-as-a-Service (Iaas) environment. Additionally, while for simplicity of illustration, FIG. 1 depicts a single cloud 130, aspects of the present disclosure can be implemented to copying computing resources across multiple clouds 130. In such execution environments the conflict manager 140 may copy computing resources in hybrid cloud environments, multi-cluster cloud environments, or the like. Duplication manager 140 is described in further detail below with respect to FIG. 2.

FIG. 2 depicts a block diagram illustrating an example of duplication manager 210 for facilitating conflict management for cloud computing services of a cloud computing environment. In some implementations, duplication manager 210 may correspond to duplication manager 140 of FIG. 1. As shown in FIG. 2, duplication manager 210 may be a component of a computing apparatus 200 that includes a processing device 205, operatively coupled to a memory 201, to execute duplication manager 210. In some implementations, processing device 205 and memory 201 may correspond to processing device 602 and main memory 604 respectively as described below with respect to FIG. 6.

Duplication manager 210 may include initialization module 212, installation module 214, matching module 216, and registration module 218. Alternatively, the functionality of one or more of initialization module 212, installation module 214, matching module 216, and registration module 218 may be combined into a single module or divided into multiple sub-modules.

Initialization module 212 may provide clients 160, 170, 180 with a list of computing resources that can be copied.

Computing resources may include applications, computer services, configuration files, or any other computing processes installed or executed on an execution environment. An application may be any type of software program deployable on an execution environment, such as, for example, nested VMs, containers, databases, web applications, web services, caches, libraries, multimedia applications, etc. A computer service may be any type of function(s) provided by and/or to the execution environment, such as, for example, web services, synchronization services, data services, operating system services, management services, drivers, etc. A configuration file may be any software used to configure the parameters and/or settings of a computer program.

Initialization module 212 can display, on the client via a graphical user interface (GUI), a list of computing resource available for copying from a source execution environment. To generate the copy list, initialization module 212 can execute a retrieval process on the source execution environment. In one example, initialization module 212 may execute a query to retrieve, from a data structure stored in memory 201, a list of services currently running on the source execution environment. The data structure may be a collection of data values, the relationships among them, and the functions or operations that can be applied to the data. In another example, initialization module 212 may execute a command (e.g., $PATH) to identify a set of directories where executable programs (e.g., applications) are located. Initialization module 212 may then display the executable programs in the copy list. In another example, initialization module 212 may maintain a data structure of computing resources that may be cpoied. The data structure may be update each time a computing resource is installed or executed in on the source execution environment. The data structure may include metadata that indicates a location (e.g., a file path) of each computing resource.

In some embodiments, the copy list, or computing resources listed by the copy list, may be protected by a security layer. For example, prior to viewing the copy list or selecting a computing resource for duplication, a security prompt may require user input to verify that the user is authorized to copy the computing resource(s). The security prompt may request a user name, password, token, or any other security measure. Responsive to verifying that the user input is accurate (e.g., the user input matches a stored value), initialization module 212 may enable access to the copy list or the computing resource listed by the copy list.

Responsive to receiving a selection of a computing resource to copy, initialization module 212 may retrieve configuration data associated with the computing resource. The configuration data may include a software installation package, configuration files, location data of installation files (e.g., uniform resource locator (URL), server address, etc.), update data, or any other data associated with installing or running the computing resource. In some embodiments, initialization module 212 may perform one or more scanning operations to retrieve the configuration data associated with the computing resource. A scanning operation may determine how the computing resource was installed (e.g., manually, from an installation package, from another source, such as, server, etc.), the location of installation package (e.g., the location of the file repository from which the installation package was retrieved, the address of a server, etc.), the location of any associated configuration files, data related to any updates or modifications performed on the computing resource, etc. In some embodiments, the scanning operation may be performed by the initialization module 212 executing a command to query a package management system for data associated with the computing resource. Responsive to the query, the package management system may provide the configuration data to initialization module 212.

The package management system is a collection of software tools that automates the process of installing, upgrading, configuring, and removing computer programs. In particular, a package management system may store and manage package configuration data, distributions of software, and other related data in a database. The database may be maintained in memory 201. Package configuration data may contain metadata, such as the software's name, description of its purpose, version data, vendor data, checksum data, a list of dependencies necessary for the software to run properly, etc. The metadata may be stored in the database upon installation of the package. The package management system may also maintain a database (e.g., in memory 201) of software dependencies, updates that were performed on the computing resource, modification that were performed on the computing resource, etc. The package management system may communicate with software repositories, binary repository managers, and application stores.

Installation module 214 may use the configuration data to install or execute the computing resource on the destination execution environment. For example, the installation module 214 may instruct the operating system of the destination execution environment to use an installation software package to install, setup, test, build, configure and/or approve the computing resource. In another example, installation module 214 may use a URL address to retrieve executable data associated with the installation of the computing resource, and instruct the operating system of the destination execution environment to execute the executable data.

Matching module 216 may determine whether there are any configuration differences between the computing resource executing on the source execution environment, and the computing resource installed on the destination execution environment. In some embodiments, to determine whether a difference exists, matching module 216 may compare the configuration parameters of the two computing resources. For example, matching module 216 may retrieve one or more configuration files associated with the computing resource executing on the source execution environment, retrieve one or more configuration files installed on the destination execution environment, and compare the correlating configuration parameters. In some embodiments, the matching module 216 may query the package management system for the configuration data. Responsive to determining that a pair of correlating configuration parameters are different, matching module 216 may generate a patch file (or any other file capable of updating or modifying the computing resource) to modify the configuration parameter on the destination execution environment. Once the patch file is generated, matching module 216 may send the patch file(s) to the destination source to be executed or applied by the operating system of the destination source. In some embodiments, matching module 216 may determine whether there are any configuration differences and generate the patch files prior to the installation module installing or executing the computing resource on the destination execution environment. Matching module 216 may then apply the patch files during the installation of the computing resource on the destination execution environment.

In some embodiments, matching module 216 may use one or more software tools to determine the configuration parameters. In one example, the software tool includes ltrace and/or strace, which intercepts and records the values of operational parameters which are called by an executed computing process of the computing resource when making a library call or a system call, respectively, along with the signals which are received by the executed process. Using these software tools, matching module 216 can then compare the recorded configuration parameters to the configuration parameters of the computing resource installed on the destination execution environment, and generate a patch file based on the difference in the parameters.

Registration module 218 may modify host-specific parameters on the computing resource installed on the destination execution environment. The host-specific parameters may include identification parameters that may be unique to different elements of the cloud computing environment. For example, host-specific parameters may include a host name, an internet protocol (IP) address, a media access control (MAC) address, a user name, a network address, a subnet mask, a default gateway, etc. In some embodiments, the registration module 218 may maintain a data structure, such as a database, which lists different host-specific parameters. In some embodiments, the data structure may be structured in a data interchange format, such as but not limited to, (e.g., JavaScript Object Notation (JSON), YAML Ain't Markup Language (YAML)), etc. In other embodiments, the data structure may be structured in a format other than a data interchange format.

The registration module 218 may then query, for example, the package management system, to determine whether the computing resource configuration includes any of the host-specific parameters. Responsive to the query being indicating that the computing resource configuration includes one or more host-specific parameters, registration module 218 may modify the host-specific parameters of the computing resource installed on the destination execution environment. Modifying the host-specific parameters of the computing resource installed on the destination execution environment prevents conflict related errors from occurring.

FIG. 3 depicts a flow diagram of an illustrative example of a method 300 for copying a computing resource from a source execution environment to a destination execution environment, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by a kernel or by executable code of a host machine (e.g., host operating system or firmware), a virtual machine (e.g., guest operating system or virtual firmware), other executable code, or a combination thereof.

Method 300 may be performed by processing devices of a server device or a client device and may begin at block 302. At block 302, the server or client device may receive a copy request to copy a computing resource from a source execution environment to a destination execution environment. The computing resource may be an application package, a computing service, a configuration file(s), or any other computing process installed or executed on the source execution environment. In some embodiments, the server or client device may first generate a list of computing resources installed on the source execution and display the list on a graphical user interface (GUI) of the client device.

At block 304, the server or client device may retrieve, from the source execution environment, configuration data associated with the computing resource. In some embodiments, retrieving the configuration data includes querying a package management system. In some embodiments, the server or client device may retrieve the first configuration parameter by intercepting values of operational parameters associated with the computing resources responsive to the computing resource executing a computing process. In some embodiments, the server or client device may generate a security prompt for user input in response to receiving the copy request. The server or client device may then retrieve the configuration data in response to validating the user input.

At block 306, the server or client device may modify, in view of a configuration of the destination execution environment, a value of a configuration parameter of the configuration data. In some embodiments, the server or client device may modify the value of a configuration parameter by, responsive to determining that a first configuration parameter associated with the computing resource installed on the source execution environment is different from a corresponding second configuration parameter associated with the computing resource installed on the destination execution environment, and then generating a patch file configured to modify the second configuration parameter. In some embodiments, the configuration parameter includes modify host-specific parameters, such as a host name, an IP address, a MAC address, a user name, a network address, a subnet mask, or a default gateway. The server or client device may modify the host-specific parameters of the computing resource installed on the destination execution environment to prevent conflict related errors from occurring.

At block 308, the server or client device may install, on the destination execution environment, the computing resource using the configuration data. Responsive to completing the operations described herein above with references to block 308, the method may terminate.

FIG. 4 depicts a block diagram of a computer system 400 operating in accordance with one or more aspects of the present disclosure. Computer system 400 may be the same or similar to computer system 200 and computing device 100 and may include one or more processing devices and one or more memory devices. In the example shown, computer system 500 may include initialization module 410, installation module 420, matching module 430, registration module 440, and database 450. In some implementations, initialization module 410 may correspond to initialization module 212 of FIG. 2, installation module 420 may correspond to installation module 214 of FIG. 2, matching module 430 may correspond to matching module 216 of FIG. 2, and registration module 440 may correspond to registration module 218 of FIG. 2.

Initialization module 410 may generate a list of computing resources installed on a source execution and display the list on a graphical user interface (GUI) of a client device. Initialization module 410 may receive a copy request to copy a computing resource from a source execution environment to a destination execution environment. The computing resource may be an application package, a computing service, a configuration file(s), or any other computing process installed or executed on the source execution environment. In some embodiments, initialization module 410 may generate a security prompt for user input in response to receiving the copy request. The server or client device may then retrieve the configuration data in response to validating the user input.

Initialization module 410 may retrieve, from the source execution environment, configuration data associated with the computing resource. In some embodiments, retrieving the configuration data includes querying a package management system. The configuration data may be stored in database 450. In some embodiments, initialization module 410 may retrieve the first configuration parameter by intercepting values of operational parameters associated with the computing resources responsive to the computing resource executing a computing process. In some embodiments, initialization module 410 may generate a security prompt for user input in response to receiving the copy request. Initialization module 410 may then retrieve the configuration data in response to validating the user input.

Installation module 420 may install, on the destination execution environment, the computing resource using the configuration data.

Matching module 430 may modify, in view of a configuration of the destination execution environment, a value of a configuration parameter of the configuration data. In some embodiments, matching module 430 may modify the value of a configuration parameter by, responsive to determining that a first configuration parameter associated with the computing resource installed on the source execution environment is different from a corresponding second configuration parameter associated with the computing resource installed on the destination execution environment, and then generating a patch file configured to modify the second configuration parameter.

Registration module 440 may modify host-specific parameters on the computing resource installed on the destination execution environment. In some embodiments, host-specific parameters may include a host name, an IP address, a MAC address, a user name, a network address, a subnet mask, or a default gateway. Registration module 440 may modify the host-specific parameters of the computing resource installed on the destination execution environment to prevent conflict related errors from occurring.

Figure 5:
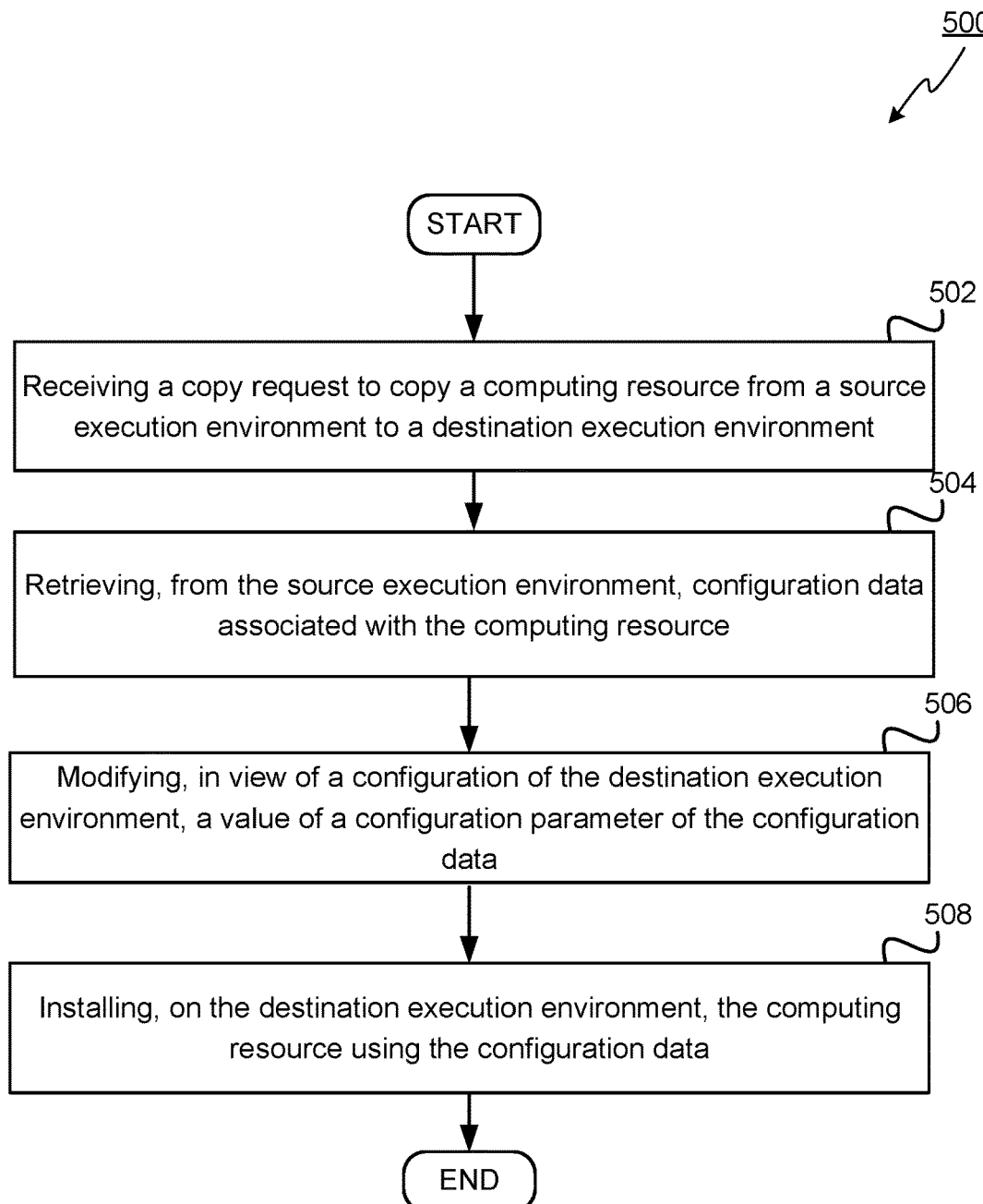
FIG. 5 depicts a flow diagram of a method for copying a computing resource from a source execution environment to a destination execution environment, in accordance with one or more aspects of the present disclosure.

FIG. 5 depicts a flow diagram of one illustrative example of a method 500 for copying a computing resource from a source computing environment to a destination computing environment, in accordance with one or more aspects of the present disclosure. Method 500 may be similar to method 300 and may be performed in the same or a similar manner as described above in regards to method 300. Method 500 may be performed by processing logic of a server device or a client device and may begin at block 502.

At block 502, processing logic may receive a copy request to copy a computing resource from a source execution environment to a destination execution environment. The computing resource may be an application package, a computing service, a configuration file(s), or any other computing process installed or executed on the source execution environment. In some embodiments, the processing logic may first generate a list of computing resources installed on the source execution and display the list on a graphical user interface (GUI) of the client device.

At block 504, the processing logic may retrieve, from the source execution environment, configuration data associated with the computing resource. In some embodiments, retrieving the configuration data includes querying a package management system. In some embodiments, the processing logic may retrieve the first configuration parameter by intercepting values of operational parameters associated with the computing resources responsive to the computing resource executing a computing process. In some embodiments, the processing logic may generate a security prompt for user input in response to receiving the copy request. The processing logic may then retrieve the configuration data in response to validating the user input.

At block 506, the processing logic may modify, in view of a configuration of the destination execution environment, a value of a configuration parameter of the configuration data. In some embodiments, the processing logic may modify the value of a configuration parameter by, responsive to determining that a first configuration parameter associated with the computing resource installed on the source execution environment is different from a corresponding second configuration parameter associated with the computing resource installed on the destination execution environment, and then generating a patch file configured to modify the second configuration parameter. In some embodiments, the configuration parameter includes modify host-specific parameters, such as a host name, an IP address, a MAC address, a user name, a network address, a subnet mask, or a default gateway. The server or client device may modify the host-specific parameters of the computing resource installed on the destination execution environment to prevent conflict related errors from occurring.

At block 508, the processing logic may install, on the destination execution environment, the computing resource using the configuration data. Responsive to completing the operations described herein above with references to block 508, the method may terminate.

Figure 6:
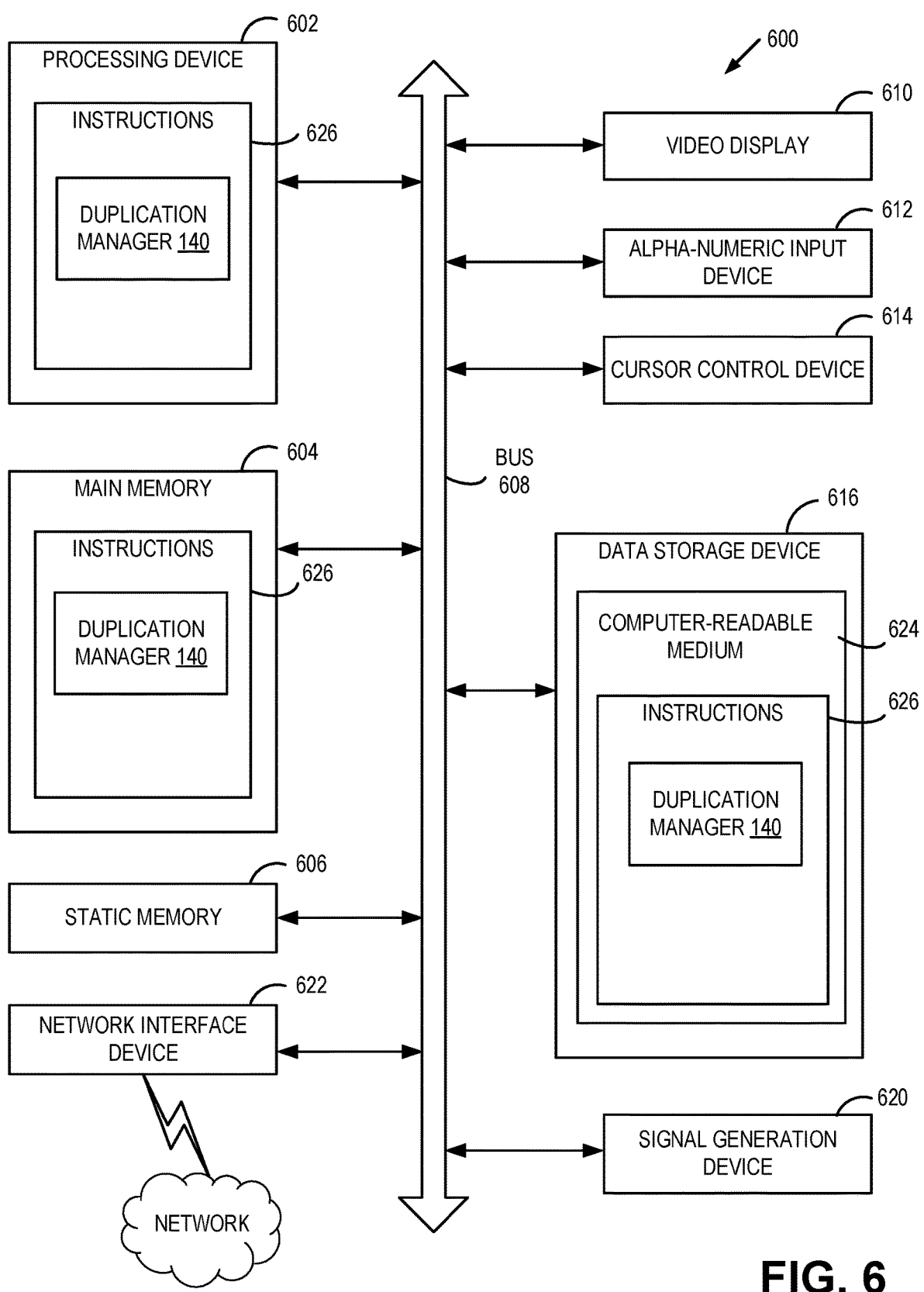
FIG. 6 depicts a block diagram of an illustrative computer system operating in accordance with one or more aspects of the present disclosure.

FIG. 6 depicts an example computer system 600 which can perform any one or more of the methods described herein. In one example, computer system 600 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 600 includes a processing device 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic (e.g., instructions 626) that includes duplication manager 140 for performing the operations and steps discussed herein (e.g., corresponding to the methods of FIGS. 3 and 5, etc.).

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker). In one illustrative example, the video display unit 610, the alphanumeric input device 612, and the cursor control device 614 may be combined into a single component or device (e.g., an LCD touch screen).

The data storage device 616 may include a non-transitory computer-readable medium 624 on which may store instructions 626 that include duplication manager 140 (e.g., corresponding to the method of FIGS. 3 and 5, etc.) embodying any one or more of the methodologies or functions described herein. Duplication manager 140 may also reside, completely or at least partially, within the main memory 604 and/or within the processing device 602 during execution thereof by the computer system 600, the main memory 604 and the processing device 602 also constituting computer-readable media. Duplication manager 140 may further be transmitted or received over a network via the network interface device 622.

While the computer-readable storage medium 624 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some execution environments, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "receiving," "determining," "executing," "rejecting," "provisioning," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, execution environment, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing execution environments. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 or 500 and one or more of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   receiving, by a processing device, a copy request to copy a computing resource from a source execution environment to a destination execution environment;
   retrieving, from the source execution environment, configuration data associated with the computing resource, wherein the configuration data includes one or more configuration files to modify configuration parameters of the computing resource and wherein the configuration parameters of the computing resource include host-specific parameters;
   retrieving a set of configuration files executing on the destination execution environment;

comparing the one or more configuration files of the configuration data and the set of configuration files executing on the destination execution environment;

modifying, in view of a difference between the one or more configuration files of the configuration data and the set of configuration files executing on the destination execution environment, a value of a configuration parameter of the configuration data;

modifying at least the configuration parameter based on a patch file, wherein the patch file is generated based on a comparison of recorded values of system calls associated with the configuration parameter to the configuration parameters installed on the destination execution environment; and installing, on the destination execution environment, the computing resource using the configuration data, wherein application of the patch file occurs during installation of the computing resource.

2. The method of claim 1, wherein the computing resource comprises at least one of an application package or a computing service.

3. The method of claim 1, wherein modifying the value of a configuration parameter comprises:

responsive to determining that a first configuration parameter associated with the computing resource installed on the source execution environment is different from a corresponding second configuration parameter associated with the computing resource installed on the destination execution environment, generating the patch file to modify the second configuration parameter; and modifying the second configuration parameter using the patch file.

4. The method of claim 1, wherein the configuration parameter is one of: a host name, an internet protocol (IP) address, a media access control (MAC) address, a user name, a network address, a subnet mask, or a default gateway.

5. The method of claim 1, wherein retrieving the configuration data associated with the computing resource comprises querying a package management system.

6. The method of claim 1, further comprising:

generating a list of computing resources installed on the source execution environment, and displaying the list on a graphical user interface (GUI) of a client device.

7. The method of claim 1, further comprising:

generating a security prompt for user input in response to receiving the copy request; and retrieving the configuration data in response to validating the user input.

8. The method of claim 1, wherein retrieving the configuration data associated with the computing resource comprises intercepting values of operational parameters associated with the computing resource responsive to the computing resource executing a computing process.

9. A system comprising:

a non-transitory computer-readable memory; and a processing device, operatively coupled to the memory, to:

receive a copy request to copy a computing resource from a source execution environment to a destination execution environment;

retrieve, from the source execution environment, configuration data associated with the computing resource, wherein the configuration data includes one or more configuration files to modify configuration parameters of the computing resource and wherein the configuration parameters of the computing resource include host-specific parameters;

retrieve a set of configuration files executing on the destination execution environment;

compare the one or more configuration files of the configuration data and the set of configuration files executing on the destination execution environment;

modify, in view of a difference between the one or more configuration files of the configuration data and the set of configuration files executing on the destination execution environment, a value of a configuration parameter of the configuration data;

modify at least the configuration parameter based on a patch file, wherein the patch file is generated based on a comparison of recorded values of system calls associated with the configuration parameter to the configuration parameters installed on the destination execution environment; and install, on the destination execution environment, the computing resource using the configuration data, wherein application of the patch file occurs during installation of the computing resource.

10. The system of claim 9, wherein the computing resource comprises at least one of an application package or a computing service.

11. The system of claim 9, wherein modifying the value of a configuration parameter comprises the processing device to:

responsive to determining that a first configuration parameter associated with the computing resource installed on the source execution environment is different from a corresponding second configuration parameter associated with the computing resource installed on the destination execution environment, generate the patch file to modify the second configuration parameter; and modify the second configuration parameter using the patch file.

12. The system of claim 9, wherein the configuration parameter is one of: a host name, an internet protocol (IP) address, a media access control (MAC) address, a user name, a network address, a subnet mask, or a default gateway.

13. The system of claim 9, wherein retrieving the configuration data associated with the computing resource comprises querying a package management system.

14. The system of claim 9, further comprising the processing device to:

generate a list of computing resources installed on the source execution environment; and display the list on a graphical user interface (GUI) of a client device.

15. The system of claim 9, further comprising the processing device to:

generate a security prompt for user input in response to receiving the copy request; and retrieve the configuration data in response to validating the user input.

16. The system of claim 9, wherein retrieving the configuration data associated with the computing resource comprises intercepting values of operational parameters associated with the computing resource responsive to the computing resource executing a computing process.

17. A non-transitory computer readable medium comprising instructions, which when accessed by a processing device, cause the processing device to:

receive a copy request to copy a computing resource from a source execution environment to a destination execution environment;

retrieve, from the source execution environment, configuration data associated with the computing resource, wherein the configuration data includes one or more configuration files to modify configuration parameters of the computing resource and wherein the configuration parameters of the computing resource include host-specific parameters;

retrieve a set of configuration files executing on the destination execution environment;

compare the one or more configuration files of the configuration data and the set of configuration files executing on the destination execution environment;

modify, in view of a difference between the one or more configuration files of the configuration data and the set of configuration files executing on the destination execution environment, a value of a configuration parameter of the configuration data;

modify at least the configuration parameter based on a patch file, wherein the patch file is generated based on a comparison of recorded values of system calls associated with the configuration parameter to the configuration parameters installed on the destination execution environment; and install, on the destination execution environment, the computing resource using the configuration data, wherein application of the patch file occurs during installation of the computing resource.

18. The non-transitory machine-readable storage medium of claim 17, wherein modifying the value of a configuration parameter comprises the processing device to:

responsive to determining that a first configuration parameter associated with the computing resource installed on the source execution environment is different from a corresponding second configuration parameter associated with the computing resource installed on the destination execution environment, generate the patch file to modify the second configuration parameter; and modify the second configuration parameter using the patch file.

19. The non-transitory machine-readable storage medium of claim 17, further comprising the processing device to:

generate a list of computing resources installed on the source execution environment; and display the list on a graphical user interface (GUI) of a client device.

20. The non-transitory machine-readable storage medium of claim 17, further comprising the processing device to:

generate a security prompt for user input in response to receiving the copy request; and retrieve the configuration data in response to validating the user input.

*     *     *     *     *